US007606880B2

(12) United States Patent
Shima

(10) Patent No.: US 7,606,880 B2
(45) Date of Patent: Oct. 20, 2009

(54) METHOD OF PRINTING OVER A NETWORK

(75) Inventor: Toshihiro Shima, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 33 days.

(21) Appl. No.: 11/634,130

(22) Filed: Dec. 6, 2006

(65) Prior Publication Data

US 2007/0076253 A1    Apr. 5, 2007

Related U.S. Application Data

(63) Continuation of application No. 10/178,485, filed on Jun. 25, 2002, now Pat. No. 7,215,437.

(30) Foreign Application Priority Data

Jul. 2, 2001    (JP)    ............................. 2001-201169
May 14, 2002    (JP)    ............................. 2002-139016

(51) Int. Cl.
G06F 15/177    (2006.01)
G06F 15/16    (2006.01)
G06F 15/00    (2006.01)

(52) U.S. Cl. ...................... 709/220; 709/217; 358/1.15

(58) Field of Classification Search ................. 709/217, 709/220; 358/1.15
See application file for complete search history.

(56) References Cited

U.S. PATENT DOCUMENTS

| | | | |
|---|---|---|---|
| 5,960,168 A | 9/1999 | Shaw et al. | |
| 6,378,070 B1 | 4/2002 | Chan et al. | |
| 6,474,881 B1 | 11/2002 | Wanda | |
| 6,795,205 B1 * | 9/2004 | Gacek | ........................ 358/1.15 |
| 6,859,843 B1 | 2/2005 | Sanchez | |
| 6,862,583 B1 | 3/2005 | Mazzagatte et al. | |
| 2002/0169884 A1 * | 11/2002 | Jean et al. | .................... 709/230 |
| 2003/0097430 A1 | 5/2003 | Matsukura | |

FOREIGN PATENT DOCUMENTS

| | | |
|---|---|---|
| EP | 0 929 023 A1 | 7/1999 |
| EP | 1 071 254 A2 | 1/2001 |
| GB | 2 350 713 A | 12/2000 |
| JP | A 07-152507 | 6/1995 |
| JP | A 08-314835 | 11/1996 |
| JP | A 10-283130 | 10/1998 |
| JP | A 10-301727 | 11/1998 |
| JP | A 11-068765 | 3/1999 |
| JP | A 11-234270 | 8/1999 |

* cited by examiner

*Primary Examiner*—Kenny S Lin
(74) *Attorney, Agent, or Firm*—Oliff & Berridge, PLC

(57) ABSTRACT

The invention proposes a scheme in which even in the case where a lot of print sites each of which provides a printing service by secure network communication are constructed on a network the print sites can be managed easily, as well as a system as an implementation of such a scheme. A printing method is provided which uses a server computer for a relay between client computers and printers that are connected to each other via a network. The server computer establishes sessions in response to secure communication session establishment requests from a client computer and a printer, respectively. The server computer connects the two sessions, and the client computer sends a print job to the printer via the server computer and causes the printer to perform a printing operation.

4 Claims, 16 Drawing Sheets

FIG.2

NETWORK SETTING PICTURE

- ACQUISITION OF IP ADDRESS
  - ○ ACQUIRE IP ADDRESS AUTOMATICALLY
  - ◉ IP ADDRESS :         aaa. bbb. ccc. 201
    - SUB-NET MASK :     255. 255. 255. 0
    - DEFAULT GATEWAY : aaa. bbb. 0. 1          —21

23— ☑ OPEN THE PRINTER TO PUBLIC AS INTERNET PRINTER
  - PRINTER NAME    [LP-9600 : InternetPrinter_1]
  - PASSWORD        [********]
  - ORGANIZATION NAME [GROUP A1]
  - CONNECTION TIMING   ◉ ALL THE TIME   ○ WHEN REQUESTED BY SERVER          —22

[ SET ]   [ CANCEL ]
   24

FIG.4

| No. | PRINTER NAME | IP ADDRESS | PORT NO. | ORGANIZATION NAME | PRINTER TYPE | MODEL | NUMBER OF QUEUEING JOBS |
|---|---|---|---|---|---|---|---|
| 011 | LS-Printer1 | aaa.bbb.ccc.101 | 4101 | GROUP A | MONOCHROME LASER PRINTER | LP9600 | 5 |
| 012 | LS-Printer4 | aaa.bbb.ccc.104 | 4102 | GROUP B | COLOR LASER PRINTER | LP8400C | 0 |
| 013 | LS-Printer3 | aaa.bbb.ccc.103 | 4103 | GROUP A | COLOR LASER PRINTER | LP8800C | 1 |
| 014 | IJ-Printer3 | aaa.bbb.ddd.101 | 4104 | GROUP C | INK JET PRINTER | PM800C | 0 |

METHOD OF PRINTING OVER A NETWORK

This is a Continuation of application Ser. No. 10/178,485 filed Jun. 25, 2002. The disclosure of the prior application is hereby incorporated by reference herein in its entirety.

BACKGROUND OF THE INVENTION

1. Field of the Invention

The present invention relates to a method of printing realized by a client computer and a printer over a network, and particularly to a printing method using a server computer that relays between the client computer and the printer.

2. Description of the Related Art

The Internet consists of network systems and various computers that are interconnected by the network systems. Computers that are interconnected by the Internet can exchange information by using various systems such as mail systems and WWW systems.

Since the Internet is an open network system, relay systems belonging to various organizations, etc., exist in the routes for connecting the computers that communicate with each other. Therefore, in general, the network communication over the Internet has security risks such as tapping (lost secrecy), falsification of data (incomplete data), and pretending to be another person (illegitimate user). And it is necessary to deal with such security-related problems. As one countermeasure, network communications using SSL (Secure Socket Layer) are now commonly conducted. The SSL, which is a protocol belonging to the session layer of the OSI reference model, provides the functions of communicating coded data, authenticating by server, and authenticating messages.

To realize a network communication using the SSL, both the client computer and the server computer must support the SSL functions. As far as Web systems are concerned, a typical client program (browser) includes such functions by default. On the other hand, as for the server computers, although a Web server program has such functions, to actually use those functions the Web server program must also incorporate a server certificate (digital certificate) that is acquired from a certificate authority.

To construct, on a network, a site (print site) that provides a service of printing data, etc., in response to a print request from a client computer, it is necessary to address the above-described security-related problems. In this case, the SSL enables a secure network communication service even if the Internet is used.

However, to actually operate the sites that enable network communications using the SSL, the management of a lot of such print sites on the network would be very cumbersome because each site must acquire its own digital certificate and incorporate the same. On the other hand, a client computer must also acquire and incorporate the digital certificates corresponding to respective sites to be used.

In view of the above, the first object of the present invention is to provide a scheme in which even in the case where a lot of print sites, are constructed on a network, each of which provides a printing service by secure network communication, the print sites can be managed easily, as well as to provide a system to implement such a scheme.

In implementing such scheme, if a print site that provides a printing service is located inside a firewall (F/W), the print site cannot receive a print request from an external client computer that is sent by a secure network communication. This is because firewalls deny outside-to-inside access though it permits inside-to-outside access.

In view of this, the second object of the invention is to provide a scheme that enables a printing service by receiving a print request that is sent by a secure network communication even in the case where the print site is located inside a firewall, as well as to provide a system to implement such scheme.

SUMMARY OF THE INVENTION

The gist of the present invention is as follows. In a printing method using a server computer for a relay between client computers and printers that are connected to each other via a network, the server computer establishes sessions in response to secure communication session establishment requests from a client computer and a printer, respectively. The server computer establishes a single session by connecting the two sessions, and the client computer sends a print job to the printer via the server computer and thereby causes the printer to perform a printing operation.

A first aspect of the invention provides a printing method using a server computer for a relay between one or more client computers and one or more printers that are connected to each other via a network, comprising the steps, executed by the server computer, of receiving a printer secure communication session establishment request from a printer and managing the printer as a usable printer; receiving a client secure communication session establishment request from a client computer and establishing a client secure communication session with the client computer; receiving, from the client computer, a print job in which the printer is designated as an output destination printer; and sending the received print job to the printer as the output destination printer.

A second aspect of the invention provides a printing method using a server computer for a relay between one or more client computers and one or more printers that are connected to each other via a network, comprising the steps, executed by the server computer, of receiving one or more registration requests from printers and managing, as usable printers, the printers that have sent the registration requests; receiving, from a client computer, a first secure communication session establishment request that is directed to an output destination printer that is one of the usable printers; sending, to the output destination printer, a request for sending a second secure communication session establishment request; receiving a second secure communication session establishment request that is sent from the output destination printer in response to the request from the server computer; establishing a secure communication session between the client computer and the output destination printer by connecting the first and second secure communication session establishment requests; and transferring, to the output destination printer with which the secure communication session has been established, a print job that is sent from the client computer.

It is preferable that the client computer, the printer, and the server computer exchange information using a prescribed communication protocol. A Web system can also be used. It is preferable that the secure communication be SSL communication.

In the above printing methods, the client computer does not directly establish the SSL communication session with the printer. Instead, the client computer sends, via the server computer, a print job to the printer after establishing the SSL communication session with the printer via the server computer that serves as a relay. This makes it possible to request a printer on the network to perform a printing operation by secure communication. In establishing the SSL communication session between the printer and the server computer, the printer is regarded as a client of the server computer. Therefore, the printer need not incorporate, into itself, a digital certificate for establishment of an SSL communication session. As a result, even where a lot of sites each having such a printer are constructed on a network, it is not necessary to acquire digital certificates for the respective sites and incorporate the certificates into the respective sites; the management of the sites is made easier. Also, a client computer that uses part of those sites need not acquire digital certificates for the respective sites and incorporate the certificates into itself; the management is made easier.

In the invention, to allow the client computer to select an output destination printer, it is preferable that the server computer send a list of usable printers to the client computer.

It is preferable that the printing methods further comprise the step of receiving registration requests from client computers on the network and managing the client computers that have sent the registration requests. In this case, it is preferable that each of the client computers be assigned its own usable printers.

It is preferable to acquire client information of prescribed items from the client computers and to search for and extract printers that can be used by each of the client computers from the usable printers based on the printer information and the client information.

It is preferable that the printing methods further comprise the step of the server computer's checking whether the usable printers are active or not. In this case, it is preferable that the server computer acquire status information of prescribed items from the usable printers.

It is preferable that the server computer establish communication sessions with respective printers and maintain those communication sessions when receiving registration requests from the respective printers. The server computer terminates an established communication session if the server computer has not received any prescribed communications from the printer for a predetermined period. Therefore, it is preferable that each printer send its own status information until the communication session is terminated. When a communication session has been terminated, it is preferable that the printer send a registration request to have a communication session established again.

Further, it is preferable to send a request for sending a secure communication session establishment request using a communication session that has been established.

The above-described invention can be considered as a method or apparatus invention, or an invention of a program for causing a computer to perform a prescribed function or a recording medium on which such a program is recorded.

BRIEF DESCRIPTION OF THE DRAWINGS

FIG. 2 shows an exemplary network setting picture for a printer according to the first embodiment;

FIG. 4 shows an exemplary printer management table according to the first embodiment;

DESCRIPTION OF THE PREFERRED EMBODIMENTS

Preferred embodiments of the present invention will be hereinafter described in detail with reference to the accompanying drawings. The embodiments are just examples for illustrating the invention and hence the invention is not limited to the embodiments. Various modifications are possible without departing from the spirit and scope of the invention.

Figure 1:
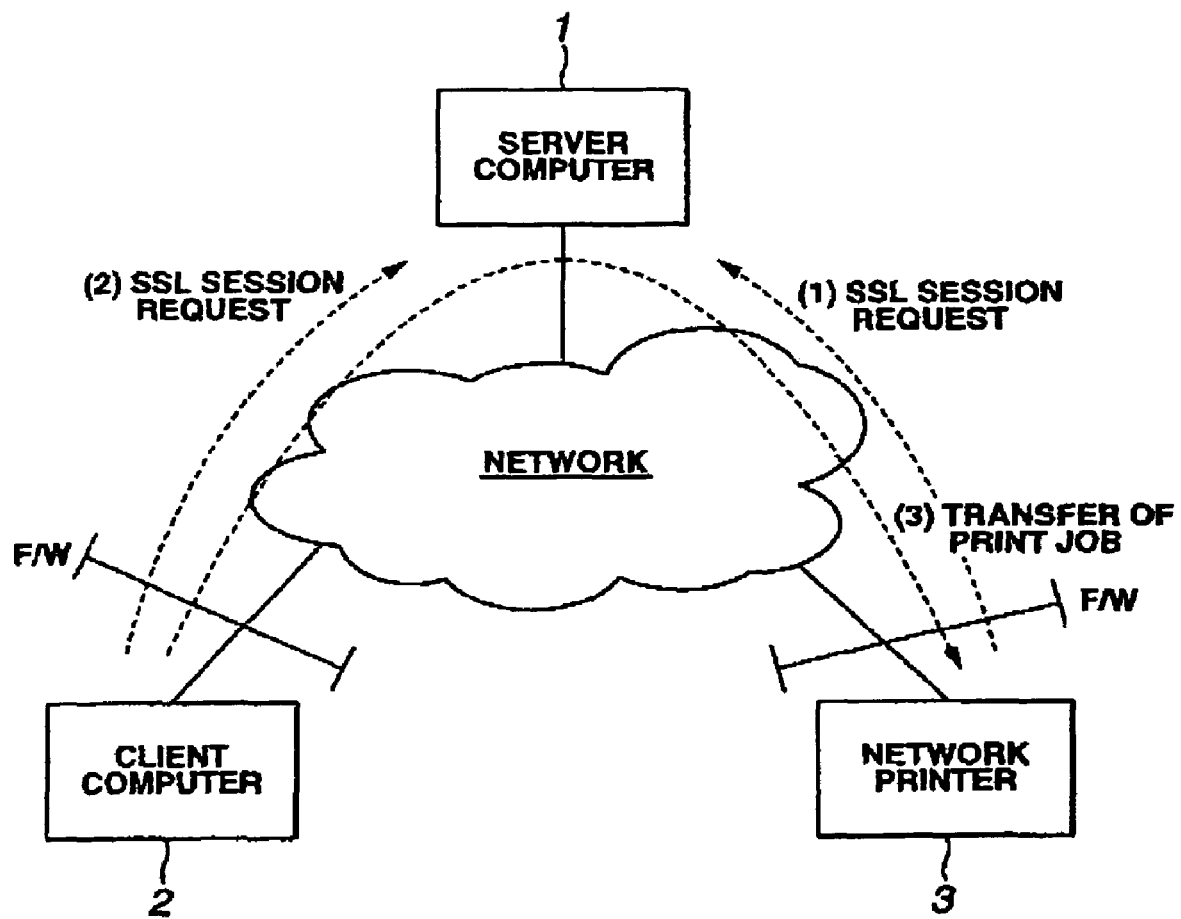
FIG. 1 shows the entire system for realizing a printing method according to an embodiment of the present invention.

FIG. 1 shows the entire system for realizing a printing method according to a first embodiment of the invention. As shown in FIG. 1, a server computer 1, a client computer 2, and a network printer (hereinafter referred to simply as "printer") 3 are interconnected so as to be able to communicate with each other over the Internet. A plurality of client computers 2 and printers 3 exist on the Internet and FIG. 1 shows only one of those client computers 2 and only one of those printers 3. Typically, the server computer 1, the client computer 2, and the printer 3 are arranged at different sites.

In this embodiment, the server computer 1, the client computer 2, and the printer 3 are configured in such a manner as to be able to communicate with each other using a prescribed communication protocol. It is preferable that each of the server computer 1, the client computer 2, and the printer 3 be equipped with a Web system. Typically, the server computer 1, the client computer 2, and the printer 3 establish a session (connection) by designating a port of the other party according to TCP/IP communication. Further, in this embodiment, the SSL is used to realize secure communication on this communication protocol. It is assumed that the server computer 1 incorporates a digital certificate that has been acquired from a prescribed certificate authority.

The server computer 1 relays information between the client computer 2 that requests printing of document data and the printer 3 that prints the document data in response to the request, and carries a central core in realizing printing by secure network communication. The printing method according to the first embodiment will be outlined below and will be described later in detail.

Before the client computer 2 requests the printer 3 on the network to perform a printing operation by secure communication (the SSL communication), the printer 3 logs in to the server computer 1 by the SSL communication and maintains a resulting session (indicated by symbol (1) in FIG. 1). The server computer 1 receives such log-in requests from various printers 3 on the network.

The client computer 2 sends the SSL communication session establishment request to the server computer 1 (indicated by symbol (2) in FIG. 1). In response, the server computer 1 establishes the SSL communication session with the client computer 2. The client computer 2 sends, to the server computer 1, a print request (print job) that specifies the printer 3 as an output destination. In response, the server computer 1 transfers the print request to the printer 3 under the SSL communication (indicated by symbol (3) in FIG. 1).

As described above, in the printing method according to the first embodiment, the client computer 2 establishes an SSL communication session via the server computer 1 that serves as a relay rather than directly with the printer 3. In establishing the SSL communication session, the printer 3 is regarded as a client of the server computer 1.

This makes it unnecessary for the printer 3 to incorporate a digital certificate for establishment of an SSL communication session into itself. Therefore, even where a large number of sites each being provided with such a printer 3 are constructed on a network, each site need not acquire a digital certificate for the printer 3 and incorporate the certificate into the printer 3; the management of the sites is made easier. Further, the client computer 2 that uses part of those sites need not acquire digital certificates corresponding to the respective sites and incorporate the certificates into itself; the management is made easier.

Since each of the client computer 2 and the printer 3 makes a connection request for establishing a session to the server computer 1, SSL communication can be used even if one or both of the client computer 2 and the printer 3 are located inside a firewall.

Various network-related settings are made in advance in the printer 3 that intends to log in to the server computer 1. FIG. 2 shows an exemplary network setting screen for the printer 3 according to the embodiment. Such network-related settings for the printer 3 can be made in such a manner that a management computer that functions as a Web client remotely accesses the printer 3 that is caused to function as a Web server for this setting purpose.

As shown in FIG. 2, the network setting screen has an IP address setting area 21 and an Internet printer setting area 22. General setting data that are necessary to use the network are input to the IP address setting area 21. If the user who manages the printer 3 wants to open the printer 3 as an Internet printer, he checks a check box 23 in the Internet printer setting area 22, inputs a printer name, a password, and the name of an organization to which the printer 3 belongs, and specifies connection timing. As the connection timing, the user specifies one of various modes of connection such as a mode in which connection is made upon application of power and maintained thereafter without interruption (all-time connection), a mode in which connection is made only when a connection request is received from the service computer 1, a mode in which connection is made immediately, and a mode in which connection is made for a certain number of minutes (to be specified) every certain period (to be specified). After inputting necessary setting data, the user manipulates a "Set" button 24, whereupon the data thus set are reflected in the printer 3.

Figure 3:
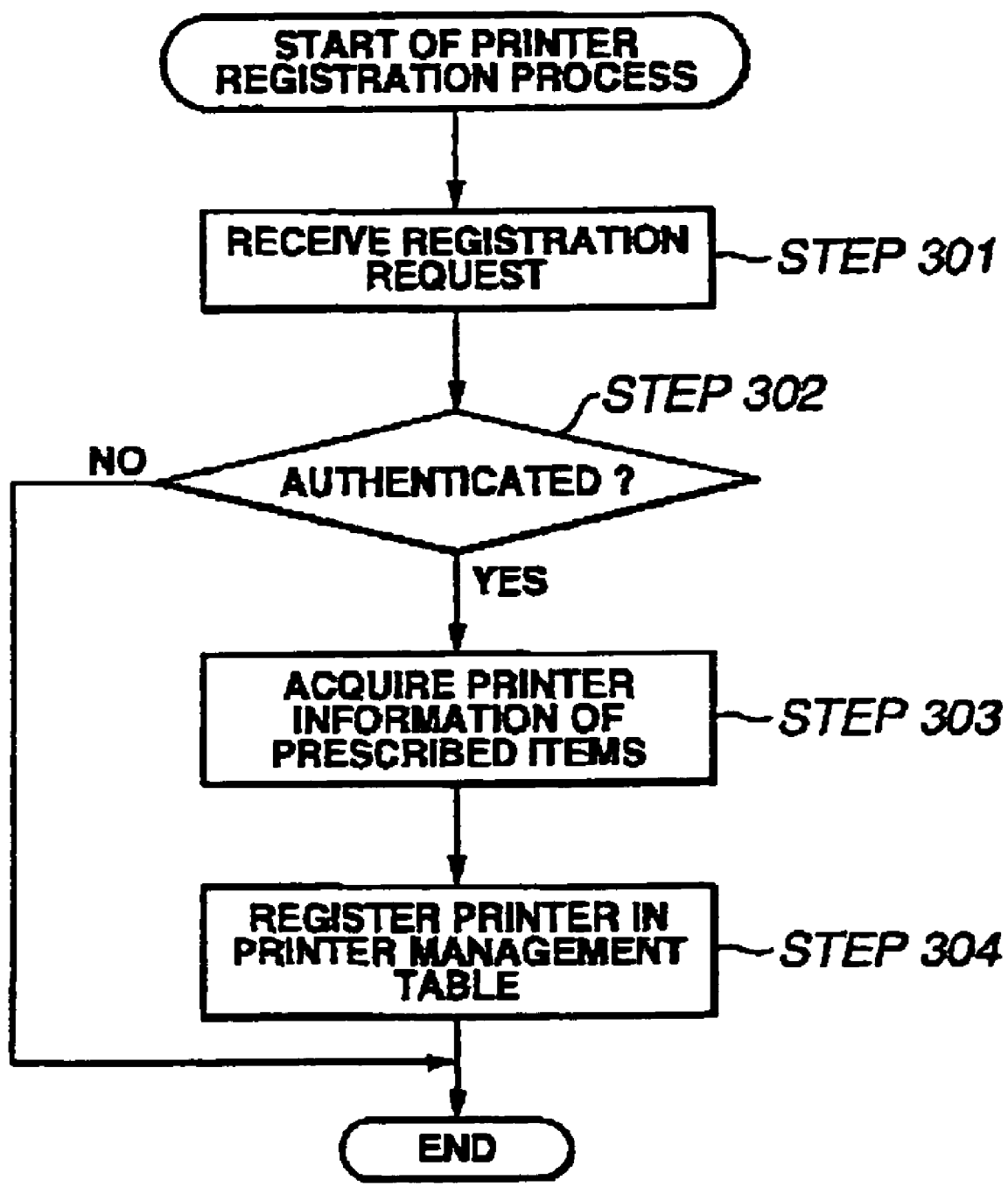
FIG. 3 is a flowchart showing a printer registration process according to the first embodiment that is executed by a server computer.

FIG. 3 is a flowchart showing a printer registration process according to the embodiment that is executed by the server computer 1. As shown in FIG. 3, the server computer 1 receives a registration request that is sent from the printer 3 on the network according to SSL communication (step 301). In this embodiment, the printer 3 is so set as to send a registration request to the server computer 1 (specified in advance) according to an initialization program that is started upon application of power. The registration request contains a printer name and a password, for example.

In response to the registration request from the printer 3, the server computer 1 judges whether to authenticate the printer 3 (step 302). If the printer 3 was authenticated at step 302, the server computer 1 acquires printer information of prescribed items from the printer 3 (step 303).

The printer information is information that is mainly used by a user in selecting a printer to be designated as an output destination. For example, the printer information includes a logical printer name of the printer 3, a network position information (i.e., an IP address or a domain name) indicating a logical position of the printer 3 on the network, the name of an organization such as a company or a group to which the printer 3 belongs, a printer type, a printer model, and the number of print jobs. The logical printer name is a printer name that is uniquely given to the printer 3 in the organization. The organization name may be the same as or similar to a domain name on the Internet. The organization name is used in judging whether a print request has come from a client computer 2 that belongs to the same organization as the printer does. That is, a client computer 2 belonging to a certain organization can request only printers 3 belonging to the same organization to perform printing. However, an exception may be made in which an organization "Public," for example, is defined and printers 3 belonging to it are allowed to receive print requests from client computers 2 belonging to any organizations. For example, the printer type indicates whether the printer 3 is a laser printer or an ink jet printer and whether it is a monochrome printer or a color printer. In most cases, the printer model name indicates a printer type number. The number of print jobs is the number of print jobs that are currently spooled in the printer 3. For example, the number of print jobs of the printer 3 is zero if it has accessed the server computer 1 immediately after being powered on.

Upon acquiring the printer information from the printer 3, the server computer 1 registers the printer 3 as a usable printer in a printer management table (step 304). The printer 3 sends status information of prescribed items to the server computer 1 every predetermined period. For example, the status information includes the number of print jobs that are currently spooled. In this manner, the server computer 1 recognizes that the printer 3 is active and the SSL communication session is maintained.

FIG. 4 shows an exemplary printer management table according to the embodiment. The printer management table is formed based on printer information that is acquired from printers 3 that logged in to the server computer 1. That is, the printer management table contains a list of printers 3 that logged in to the server computer 1 and information of those printers 3. For example, the printer management table consists of items of "logical printer name," "IP address," "port number," "printer type," "printer model," "number of queueing jobs" indicating the number of print jobs that are spooled in a printer, and "state" indicating the state of the printer. These pieces of information are managed by using a unique printer management ID that is issued by the server computer 1.

The server computer 1 updates the contents of the printer management table by receiving status information that is sent from each printer 3 every predetermined period and includes the number of print jobs currently spooled. If the connection to a printer 3 has been broken or the server computer 1 has not received any information from a printer 3 for a predetermined period, the server computer 1 judges that the printer 3 is not active and changes the "state" item of the printer 3 to "sleep" in the printer management table. The sleep state means that users cannot use the printer 3 though it is registered in the printer management table. Conceivable reasons why no response comes from a printer 3 are the printer 3's being powered off, a network failure, etc. If judging that a sleep state has lasted for a long time, the server computer 1 deletes the printer 3 from the printer management table.

Next, processes that are executed by the client computer 2 will be described. Before executing a print request process, the client computer 2 executes a process of registering usable printers 3 according to interactive manipulations. For example, this registration process is realized by a printer addition program that is prepared in an operating system in advance.

FIGS. 5A-5C and 6 show exemplary pictures through which the client computer 2 registers usable printers. This example is such that a user acquires a list of Internet printers as usable printers from the server computer 1 and registers a desired Internet printer.

Figure 5A:
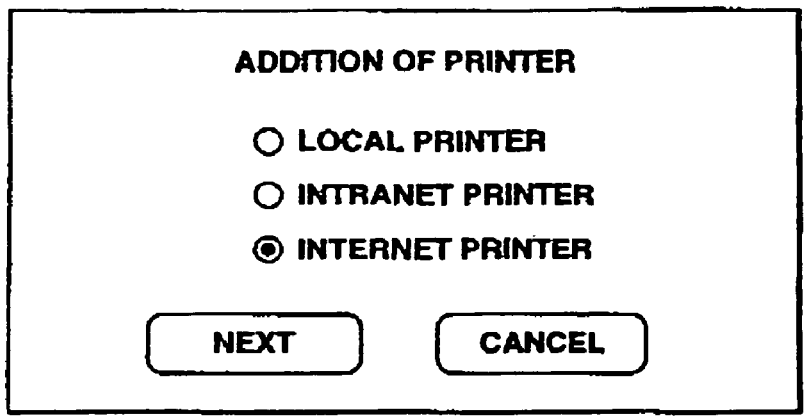
FIGS. 5A-5C and 6 show exemplary pictures according to the first embodiment through which a client computer registers usable printers.
Figure 5B:
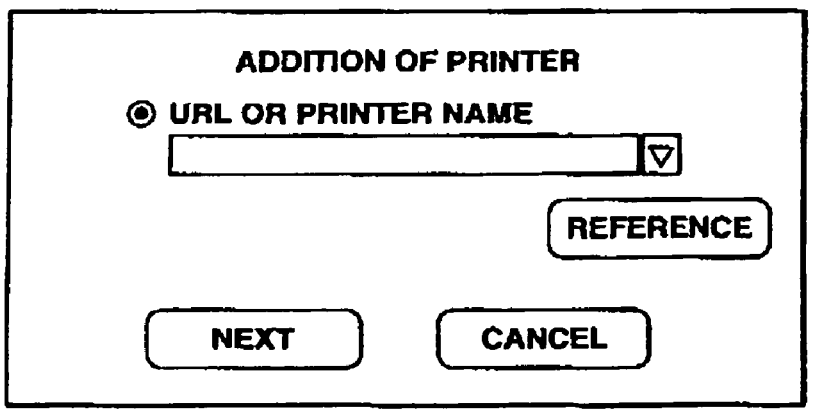

First, when a user has initiated execution of a printer addition program, the client computer 2 displays a dialogue box as shown in FIG. 5A and urges the user to select a type of printer he is going to add. If the user selects an item "Internet printer," the client computer 2 displays a dialogue box as shown in FIG. 5B and requests the user to input a specific logical printer name of the Internet printer.

Figure 5C:
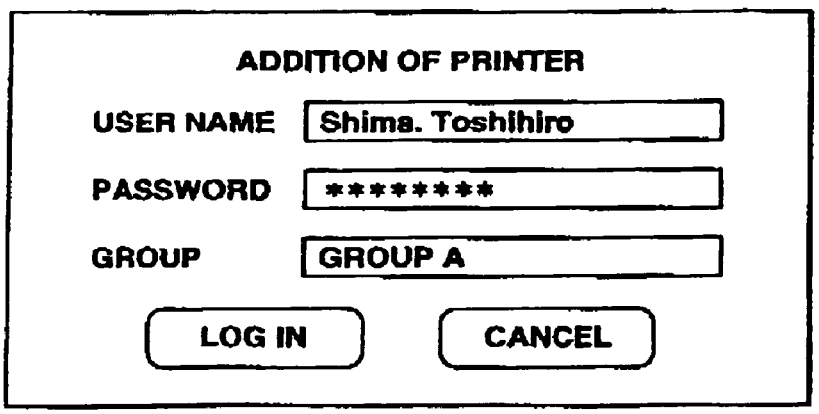

Assume here that the user has selected a "Reference" button 51 to search printers that are available on the Internet. The client computer 2 displays a dialogue box as shown in FIG. 5C and urges the user to input "a user name", "a password", and "a group" that are necessary to log in to the server computer 1. If the user inputs proper character strings and manipulates a "Log in" button, the client computer 2 establishes a session with the server computer 1 and sends a log-in request to the server computer 1. In response, the server computer 2 performs log-in authentication processing. In this case, it is preferable that the client computer 2 and the server computer 1 establish an SSL communication session.

If the server computer 1 has log-in-authenticated the client computer 2, the server computer 1 refers to the printer management table, extracts printers that can be used by the client computer 2, and sends a list of printer information of the usable printers to the client computer 2. That is, in this example, the server computer 1 extracts, as usable printers, printers that belong to the same organization as the user does and sends information of those printers 3. In response, the client computer 2 displays a dialogue box as shown in FIG. 6.

Figure 6:
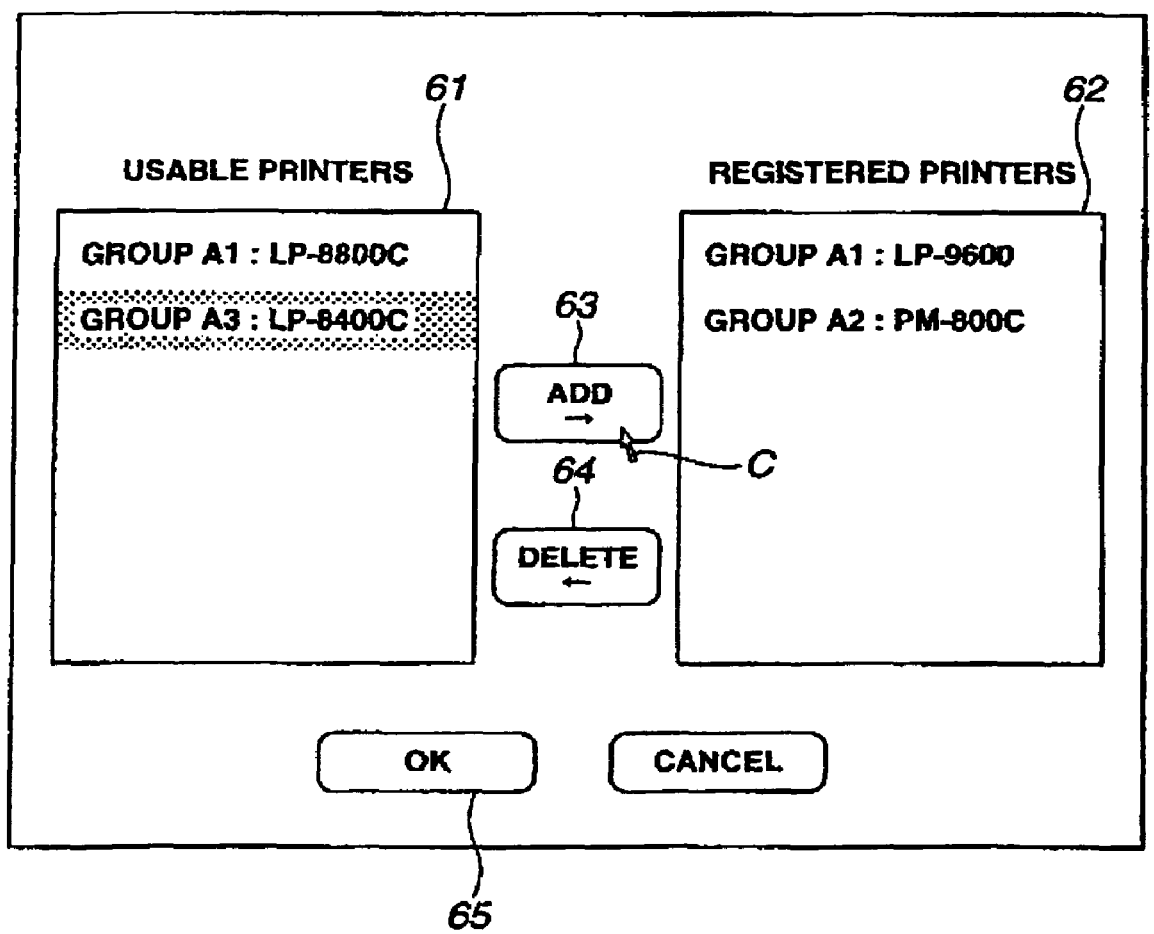

The dialogue box shown in FIG. 6 has a usable printer name display area 61 and a registered printer name display area 62. Among the usable printers on the list that has been sent from the server computer 2, the client computer 2 displays already registered ones in the right-hand, registered printer name display area 62 and displays the other ones on the left-hand, usable printer name display area 61.

If the user selects a printer name that is displayed in the left-hand, usable printer name display area 61 by manipulating a mouse cursor C and then manipulates an "Add" button 63, the selected printer name is moved to the right-hand, registered printer name display area 62. If the user selects a printer name that is displayed in the right-hand, registered printer name display area 62 by manipulating the mouse cursor C and then manipulates a "Delete" button 64, the selected printer name is moved to the left-hand, usable printer name display area 61. If the user manipulates an "OK" button 65, the client computer 2 registers the current setting and terminates the session with the server computer 2.

Figure 7:
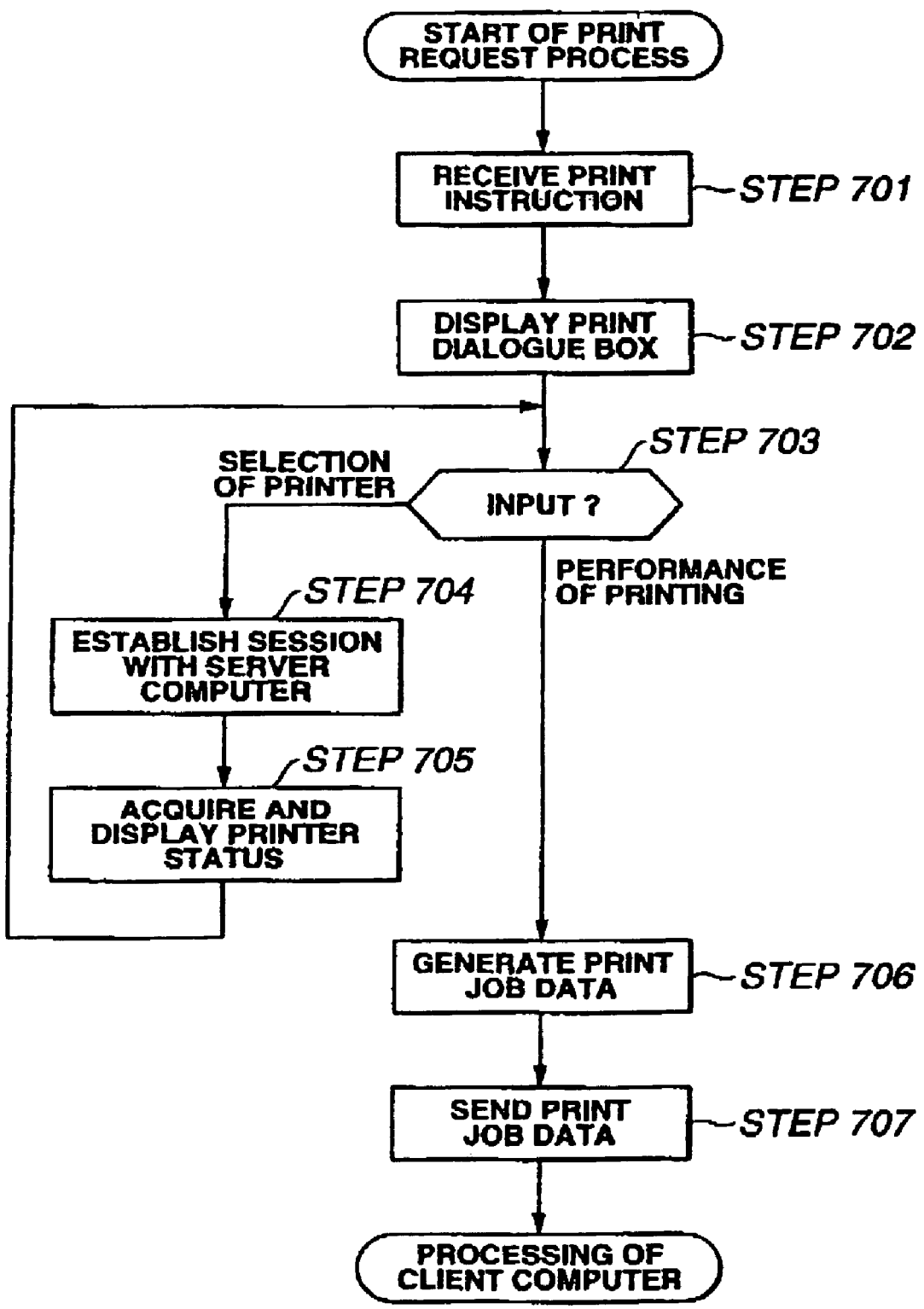
FIG. 7 is a flowchart showing a print request process according to the first embodiment that is executed by the client computer.

FIG. 7 is a flowchart showing a print request process according to the embodiment that is executed by the client computer 2. If the user gives a print instruction while an application program is being executed on the client computer 2, the application program calls a printer driver and passes application data as a subject of printing to the printer driver (step 701). The printer driver that has been called by the application program displays a print dialogue box on the screen of the client computer 2 (step 702), whereupon a state of waiting for an input from the user is established (step 703).

Figure 8:
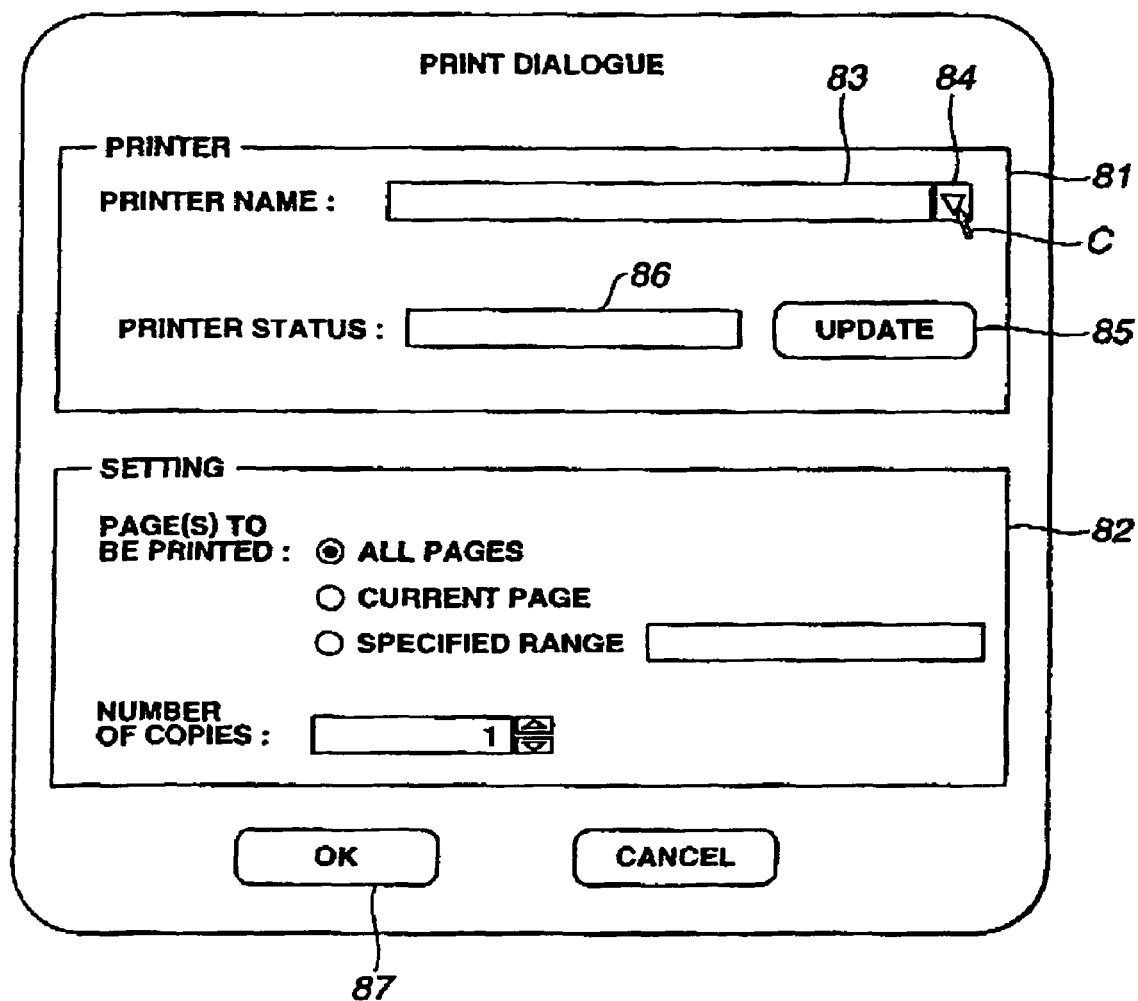
FIGS. 8-10 show how an exemplary print dialogue box according to the first embodiment is displayed on the screen and manipulated.
Figure 9:
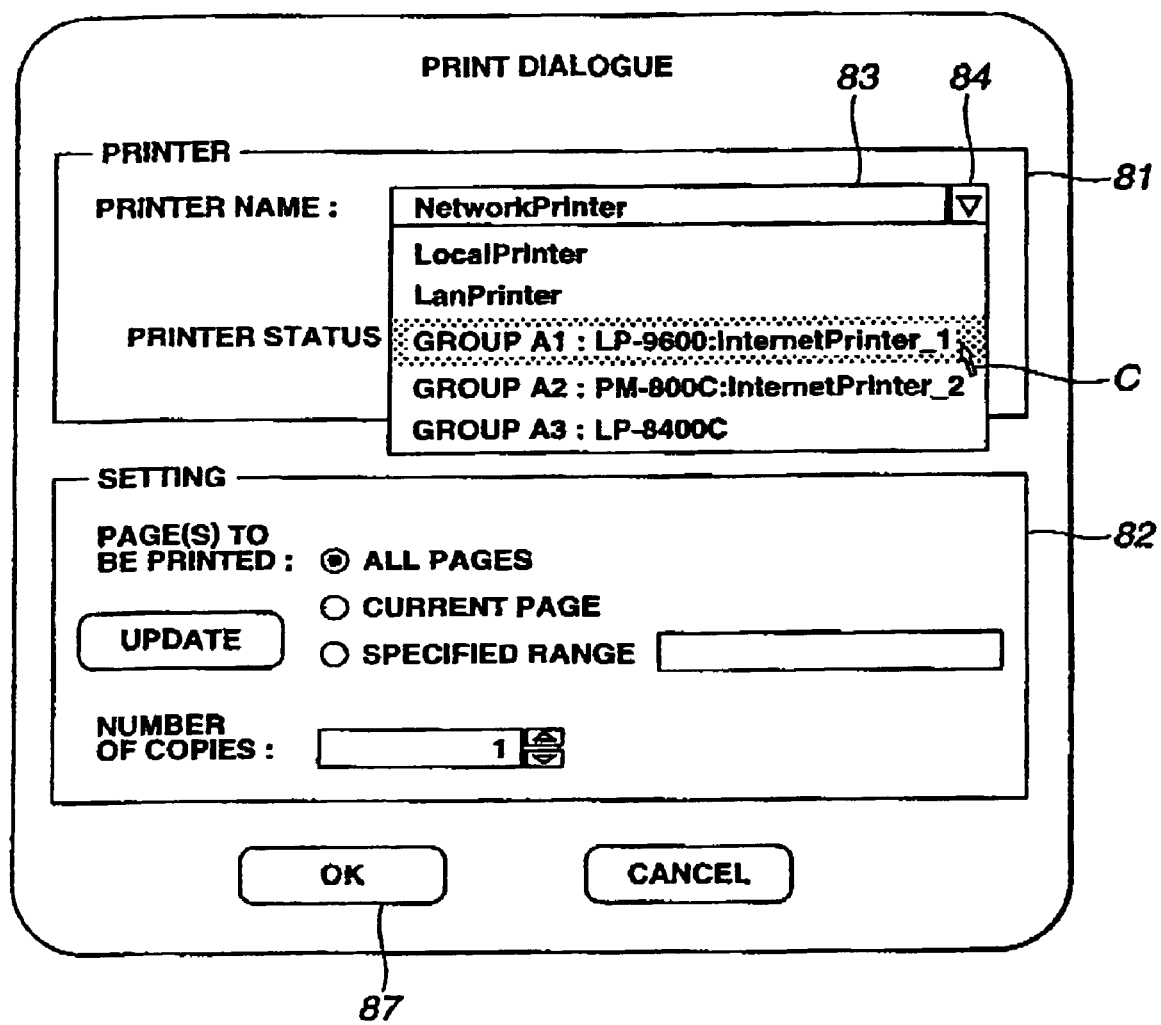

FIG. 8 shows an exemplary print dialogue box being displayed on the screen, which has a printer selection area 81 and a setting area 82. The printer selection area 81 has a printer name display space 83 and a pull-down button 84. If the user manipulates the pull-down button 84 with the mouse cursor C, the client computer 2 displays a list of usable printers.

Figure 10:
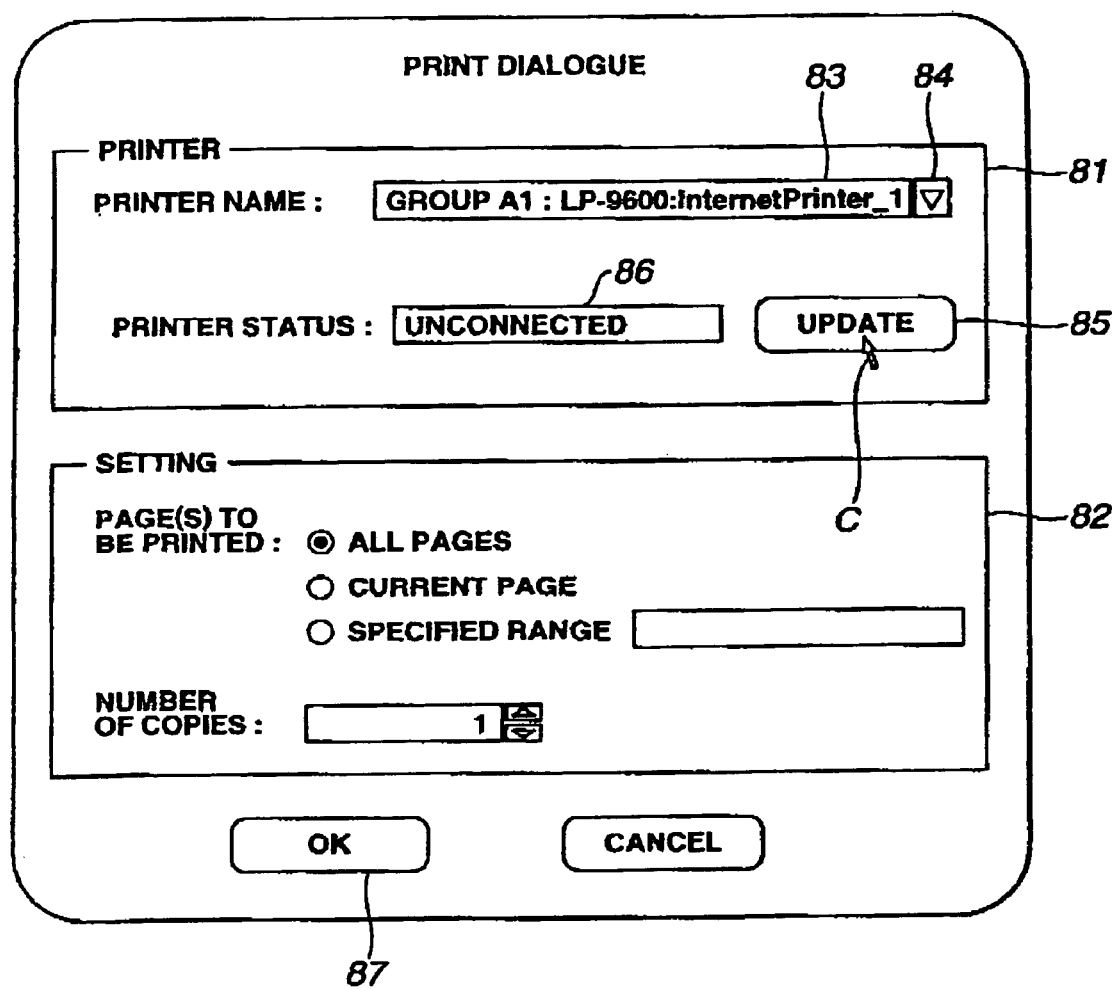

That is, if the pull-down button 84 is manipulated, the printer driver displays a list of already registered, usable printers as a pull-down menu in the print dialogue box. If the user selects an output destination printer from the pull-down menu, the print dialogue box becomes as shown in FIG. 10. If the user manipulates an "Update" button 85 in this state, a log-in authentication dialogue box (described above; see FIG. 5C) is displayed. Then, the client computer 2 establishes an SSL communication session with the server computer 1 (step 704), acquires status information of the selected output destination printer, and displays it in a printer status space 86 (step 705). Examples of the status information of the output destination printer that is acquired and displayed at this stage are "ready" indicating that the printer is waiting for print job data, "printing" indicating that the printer is performing a printing operation based on print job data, and the number of print jobs being spooled.

If the user manipulates an "OK" button 87 in a state that an Internet printer is selected as an output destination printer, the printer driver generates print job data based on application data (step 706). Then, the printer driver sends the generated print job data to the server computer 1 together with output destination printer designation information according to SSL communication (step 707). The server computer 1 receives the print job data from the client computer 2 and transfers it to a printer 3 corresponding to the output destination printer designation information. More specifically, the server computer 1 identifies an IP address and a port number of the output destination printer based on the output destination printer designation information that is sent from the client computer 2 by referring to the printer management table, and connects a session corresponding to the identified IP address and port number and the session of the client computer 2. Then, the server computer 1 transfers, to the specified output destination printer, the print job data that is sent from the client computer 2. The printer 3 receives the print job data that is sent from the server computer 1 and performs a printing operation based on the received print job data. The client computer 2 terminates the session with the server computer 1 upon sending the print job data.

Although in this embodiment the client computer 2 acquires the names of usable printers from the server computer 1 and registers printers in advance, the client computer 2 may acquire the names of usable printers from the server computer 1 and select a printer at the time of making a print request.

Specifically, if the pull-down button 84 is manipulated by the user in a state that the print dialogue box of FIG. 8 is displayed, the printer driver requests the server computer 1 to send a list of printers 3 that have logged in to the server computer 1. In response, the server computer 1 refers to the printer management table and sends, to the client computer 2, a list of printers that can be used by the client computer 2. The client computer 2 receives the list of usable printers, and displays their names and the names of other, preset usable printers such as printers on LAN as a pull-down menu in the print dialogue box. The user selects an output destination printer from the printers of the pull-down menu. If the user manipulates the "OK" button 87 in a state that an output destination printer is selected, as described above the printer driver generates print job data based on application data and sends the generated print job data to the server computer 1 together with output destination printer designation information according to SSL communication. The server computer 1 receives the print job data from the client computer 2 and transfers it to a printer 3 corresponding to the output destination printer designation information. The printer 3 receives the print job data and performs a printing operation based on the print job data.

In this embodiment, the server computer 1 manages the states of printers 3 in a unified manner using the printer management table based on pieces of status information that are sent from the respective printers 3. A modification is possible in which when receiving, from the client computer 2, a request for acquiring status information of a specified printer 3, the server computer 1 acquires status information from the printer 3 and sends back the acquired status information to the request source client computer 2.

As described above, according to the first embodiment, the client computer 2 does not directly establish an SSL communication session with a printer 3. Instead, the client computer 2 sends, via the server computer 1, a print job to a printer 3 that has already established an SSL communication session with the server computer 1. This makes it possible to request a printer 3 on the network to perform a printing operation by secure communication. In establishing an SSL communication session between the printer 3 and the server computer 1, the printer 3 is regarded as a client of the server computer 1. Therefore, the printer need not incorporate, into itself, a digital certificate for establishment of an SSL communication session. As a result, even where a lot of sites each having such a printer 3 are constructed on a network, it is not necessary to acquire digital certificates for the respective printers 3 and incorporate the certificates into the respective printers 3; the management of the sites is made easier.

Figure 11:
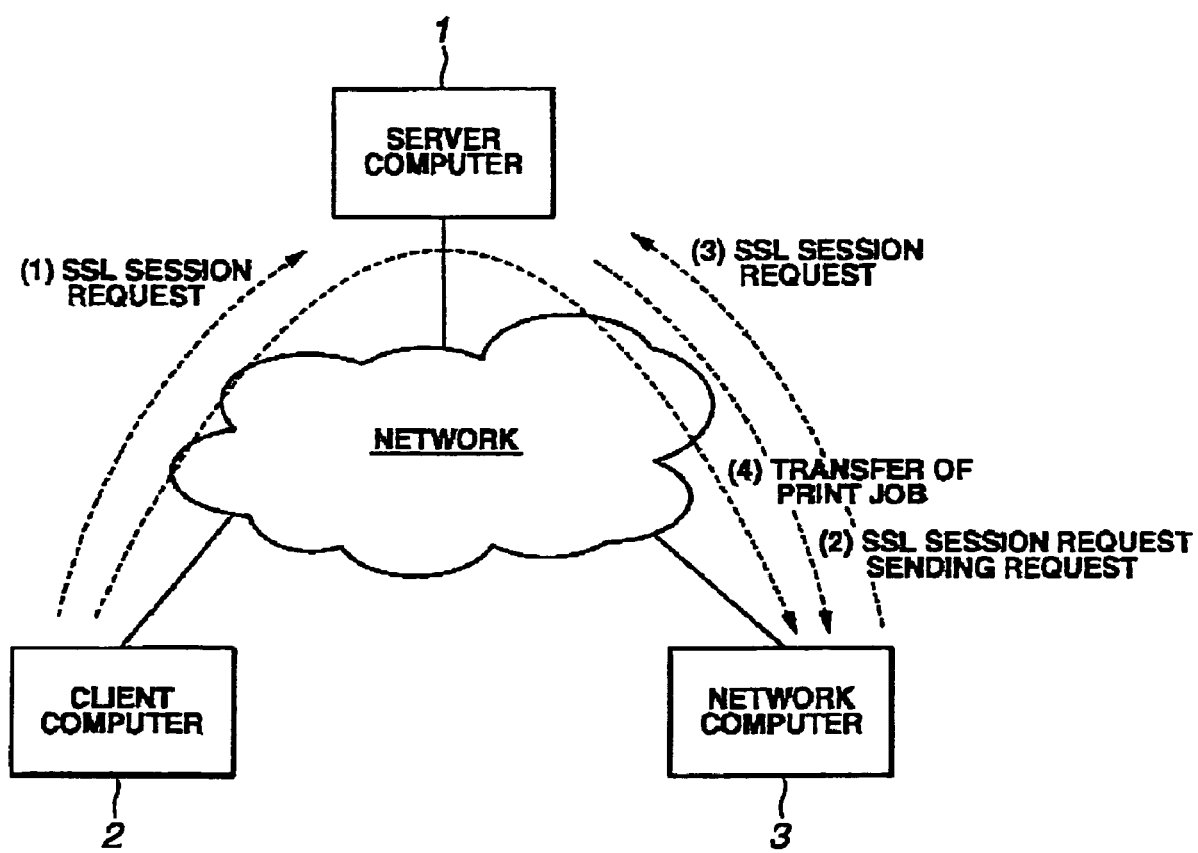
FIG. 11 shows the entire system for realizing a printing method according to a second embodiment of the invention.

Next, a second embodiment of the invention will be described. FIG. 11 shows the entire system for realizing a printing method according to the second embodiment of the invention. In this embodiment, it is assumed that a server computer 1, a client computer 2, and a printer 3 are configured in such a manner as to be able to exchange information with each other using a Web system. It is also assumed in this embodiment that SSL is used for realizing secure communication in the Web system.

The printing method according to the second embodiment will be outlined below and will be described later in detail. The second embodiment is different from the first embodiment in that the printer 3 sends an SSL session request in response to an SSL session request sending request that is sent from the server computer 1.

To request the printer 3 on the network to perform a printing operation by secure communication (SSL communication), first, the client computer 2 sends an SSL communication session establishment request to the server computer 1 (indicated by symbol (1) in FIG. 11). In response, the server computer 1 establishes an SSL communication session with the client computer 2 and sends, to the printer 3, a request for sending an SSL communication session establishment request (indicated by symbol (2) in FIG. 11). In response, the printer 3 sends an SSL communication session establishment request to the server computer 1 (indicated by symbol (3) in FIG. 1). In response, the server computer 1 establishes an SSL communication session with the printer 3. Then, the server computer 1 connects the sessions that are established with the client computer 2 and the printer 3, respectively. Then, the client computer 2 sends, to the server computer 1, by SSL communication, a print request (print job) that is directed to the printer 3. The server computer 1 transfers the print request to the printer 3 by SSL communication (indicated by symbol (4) in FIG. 1).

As described above, in the printing method according to the second embodiment, the client computer 1 establishes an SSL communication session via the server computer 1 that serves as a relay rather than directly with the printer 3. In establishing the SSL communication session, the printer 3 is regarded as a client of the server computer 1.

This makes it unnecessary for the printer 3 to incorporate a digital certificate for establishment of an SSL communication session into itself. Therefore, even where a large number of sites each being provided with such a printer 3 are constructed on a network, each site need not acquire a digital certificate for the printer 3 and incorporate the certificate into the printer 3; the management of the sites is made easier.

Also in this embodiment, as in the case of the first embodiment, the printer 3 sends a registration request to the server computer 1 and registered in a printer management table of the server computer 1. However, unlike the case of the first embodiment, the printer 3 does not maintain this SSL communication session with the server computer 1 and establishes an SSL communication session again at the time of a print request.

The server computer 1 checks whether the printers 3 registered in the printer management table are currently active by sending commands to those printers 3 with prescribed timing. If the server computer 1 does not receive any response from a printer 3 in this activeness check, the server computer 1 judges that the printer 3 is not active and deletes the printer 3 from the printer management table. Conceivable reasons why no response comes from a printer 3 are the printer 3's being powered off, a network failure, etc. It is preferable that in the activeness check the server computer 1 ask the printers 3 about status information such as the number of spooled print jobs and update the contents of the printer management table in accordance with answers.

Figure 12:
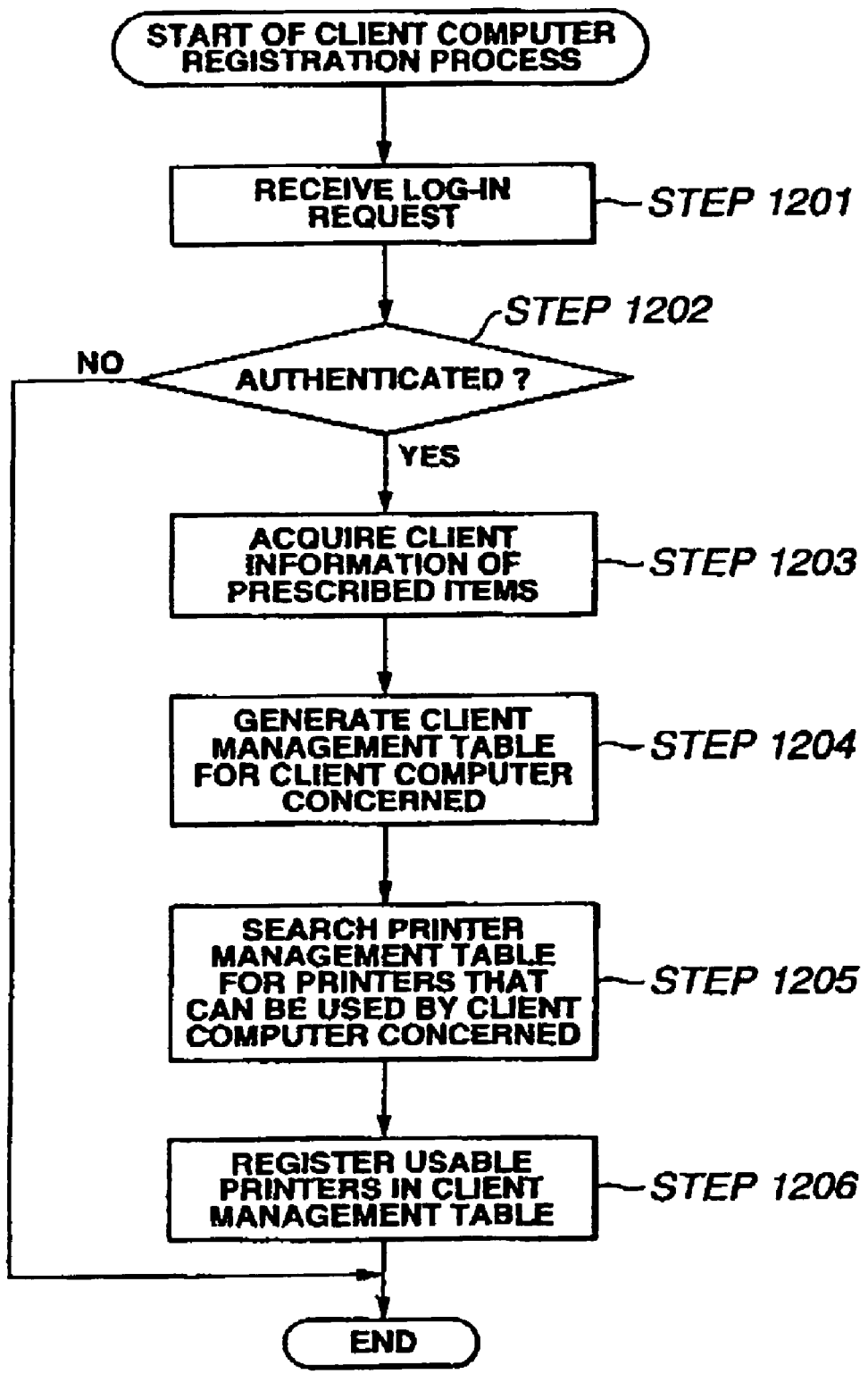
FIG. 12 is a flowchart showing a client computer registration process according to the second embodiment that is executed by a server computer.

FIG. 12 is a flowchart showing a client computer registration process according to the embodiment that is executed by the server computer 1. When the user of the client computer 2 wants to request a certain printer 3 on the network to perform a printing operation, he accesses the server computer 1 by performing interactive manipulations through a Web browser and causes a log-in picture for requesting a print operation to be displayed on the Web browser. At this time, SSL communications are performed between the client computer 2 and the server computer 1. That is, the client computer 2 sends an HTTP connection request to the server computer 1 according to the https scheme.

If the user inputs a log-in name and a password to the log-in picture and manipulates a log-in button, the client computer 2 sends a log-in request containing those input pieces of information to the server computer 1. The server computer 1 receives the log-in request that is sent from the client computer 2 (step 1201). In response to the log-in request, the server computer 1 judges whether to authenticate the client computer 2 (step 1202). If the client computer 2 was authenticated at step 1202, the server computer 1 acquires client information of prescribed items from the client computer 2 (step 1203). For example, the client information includes a network position information (IP address) indicating a logical position of the client computer 3 on the network and the name of an organization to which the client computer 3 belongs. Upon acquiring the client information from the client computer 2, the server computer 1 generates a client management table for the client computer 2 (step 1204).

Then, the server computer 1 searches the printer management table for printers 3 that can be used by the client computer 2 using the organization name as a key and extracts those printers 3 (step 1205). This is to allow the client computer 2 to request only the printers 3 belonging to the same organization to perform a printing operation. The server computer 1 registers the extracted printers 3 in the client management table to assign the extracted printers 3 to the client computer 2 (step 1206). Upon completing the log-in processing for the client computer 2, the server computer 1 causes a usable printer list picture to be displayed on the client computer 2 according to the contents of the client management table.

Figure 13:
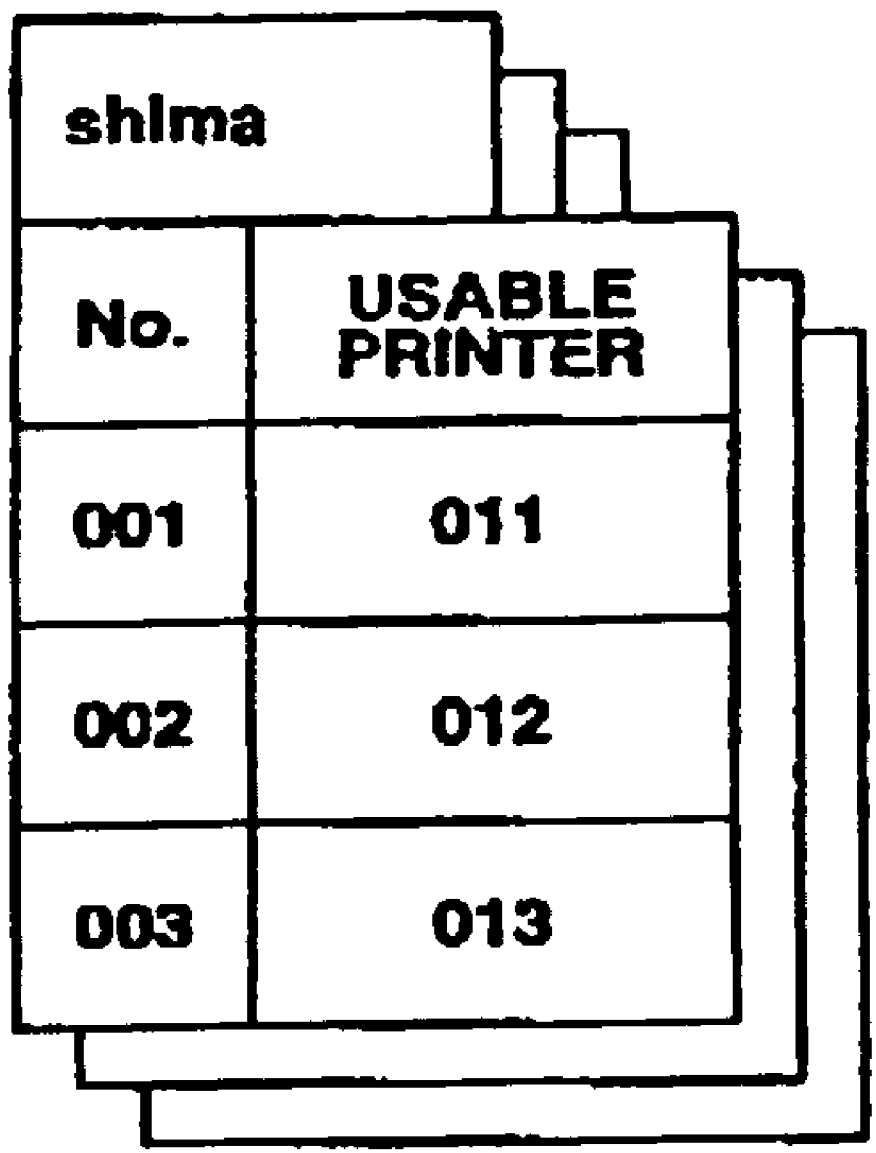
FIG. 13 shows an exemplary client management table according to the second embodiment.

FIG. 13 shows an exemplary client management table according to the embodiment. A client management table is generated for each client computer 2 that has logged in to the server computer 1. The client management table contains printer management IDs indicating respective usable printers in the printer management table shown in FIG. 4. Information relating to a printer in the printer management table can be referred to by using its printer management ID. The printer management table shows a list of printers 3 that can be used by the associated client computer 2, the list being provided by the server computer 1. In this example, the client management table corresponding to a log-in name "shima" shows that printers 3 indicated by printer management IDs "011," "012," and "013" in the printer management table can be used.

Figure 14:
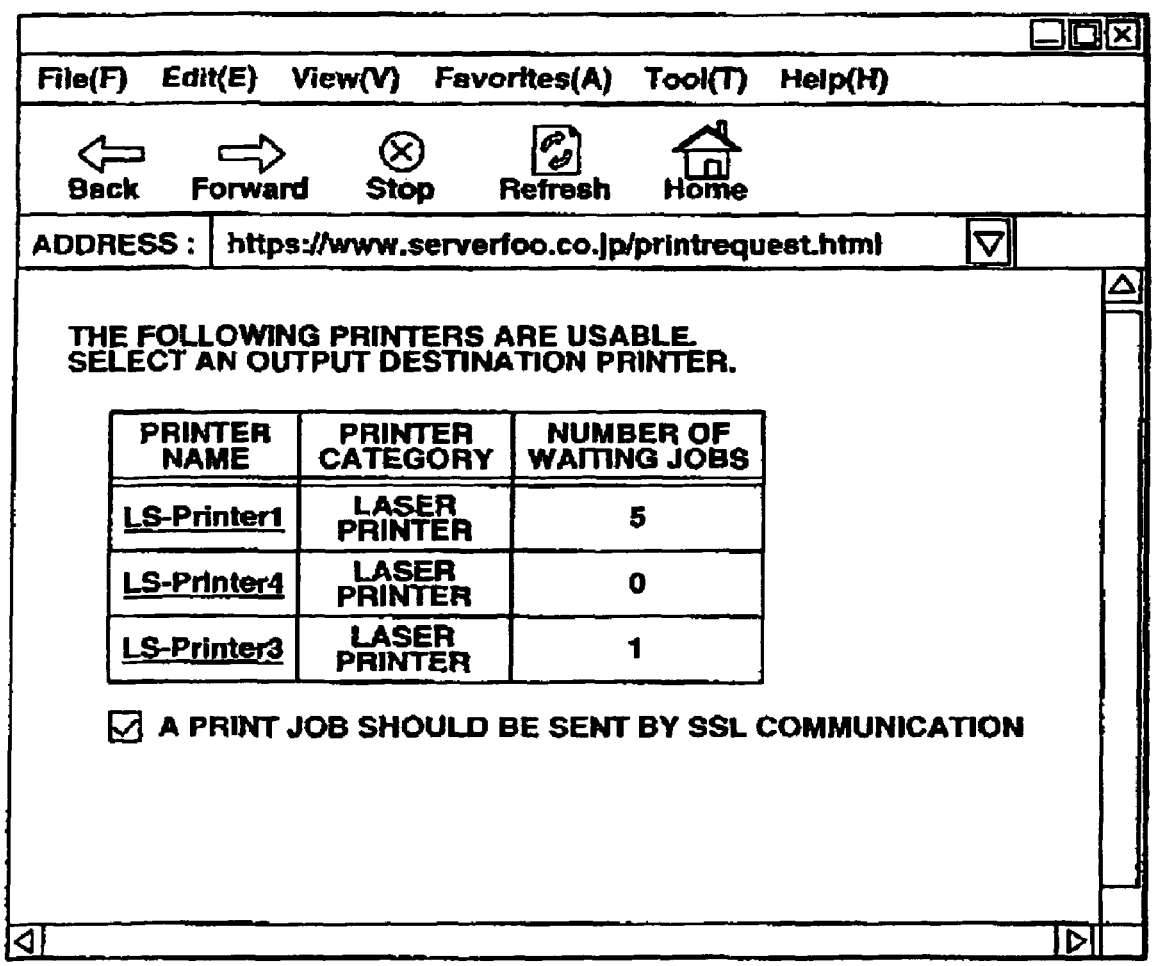
FIG. 14 shows an exemplary usable printer list page according to the second embodiment.

FIG. 14 shows an exemplary usable printer list page according to the embodiment. As shown in FIG. 14, a list of printer names are displayed on the Web browser of the client computer 2 together with categories and the numbers of waiting jobs of the respective printers 3. The printer names are given printer management IDs as parameters, respectively. If the user selects one of the printers 3 thus shown, a printer selection request containing its printer management ID is sent to the server computer 1, whereupon processing of requesting a printing operation proceeds.

Figure 15:
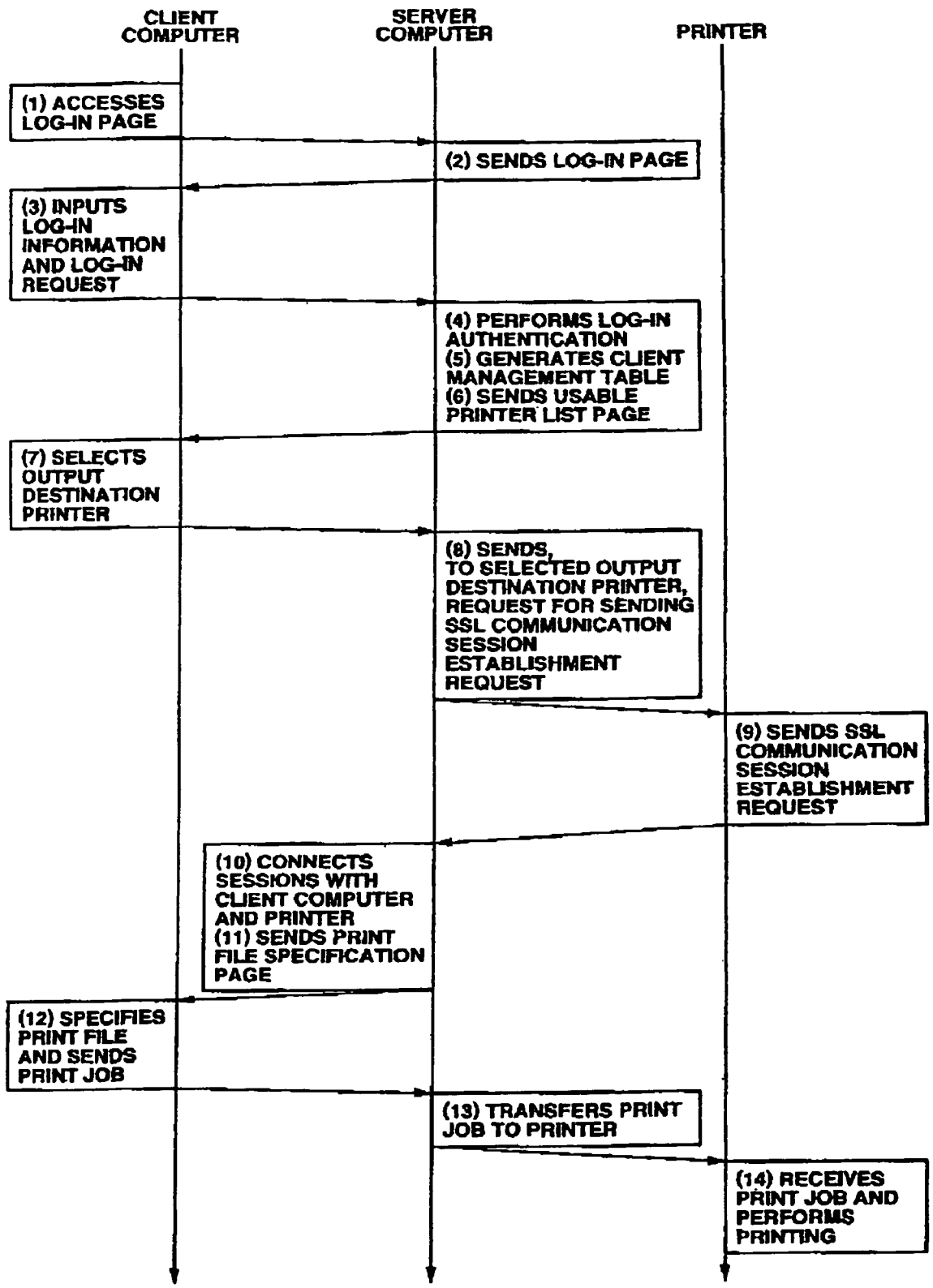
FIG. 15 is a sequence diagram showing a processing flow of the printing method according to the second embodiment.

FIG. 15 is a sequence diagram showing a processing flow of the printing method according to the embodiment. It is assumed that before execution of the following process the server computer 1 has received registration requests from a plurality of printers 3 and those printers 3 have been registered in the printer management table as usable printers.

When the user wants to cause a printer 3 on the network to print a certain file (document data) by secure communication, he accesses a log-in page for requesting a print operation on the server computer 1. More specifically, the client computer 2 that has been manipulated by the user sends, to the server computer 1, a log-in page acquisition request for requesting a printing operation that contains an SSL communication session establishment request (indicated by symbol (1) in FIG. 15). From this time onward, communications between the client computer 2 and the server computer 1 are performed according to SSL communication. Receiving this connection request, the server computer 1 sends a log-in page to the server computer 2 (indicated by symbol (2) in FIG. 15). Given the log-in page, the user inputs a user name, a password, etc. and manipulates a log-in button, whereupon the client computer 2 sends a log-in request containing the input information to the server computer 1 (indicated by symbol (3) in FIG. 15).

Receiving the log-in request, the server computer 1 judges whether to authenticate the client computer 2 (indicated by symbol (4) in FIG. 15). If the client computer 2 has been authenticated, the server computer 1 generates a client management table for the client computer 2 (indicated by symbol (5) in FIG. 15). The server computer 1 generates a usable printer list page showing a list of printers 3 that can be used by the client computer 2 and sends it to the client computer 2 (indicated by symbol (6) in FIG. 15). Given the usable printer list page (see FIG. 14), the user selects a desired one from the printers 3 shown in the list. When the desired printer 3 has been selected by the user, the client computer 2 sends a printer selection request containing the printer management ID of the selected printer 3 to the server computer 1 (indicated by symbol (7) in FIG. 15). Receiving the printer selection request, the server computer I refers to the printer management table based on the printer management ID contained therein and sends, to the printer 3, a request for sending an SSL communication session establishment request (indicated by symbol (8) in FIG. 15). This is to request the printer 3 to send an SSL communication session establishment request to the server computer 1 itself. Receiving this sending request, the printer 3 sends an SSL communication session establishment request to the server computer 1 (indicated by symbol (9) in FIG. 15).

Receiving the SSL communication session establishment request from the printer 3, the server computer 1 establishes an SSL communication session and assigns this session with the printer 3 to the session that is established with the client computer 2 (indicated by symbol (10) in FIG. 15). That is, the server computer 1 connects the sessions with the client computer 2 and the printer 3, respectively. As a result, the client computer 2 is connected to the printer 3 via the server computer 1 by means of the single session. Upon connecting the two sessions, the server computer 1 send, to the client computer 2, a print file specification page to be used for specifying a file (document data) to be printed (indicated by symbol (11) in FIG. 15).

Given the print file specification page, the user selects document data to be printed and manipulates a printing execution button, whereupon the client computer 2 generates print job data based on the document data and sends it to the server computer 1 as a print job (indicated by symbol (12) in FIG. 15). Receiving the print job from the client computer 2, the server computer 1 transfers it to the session-connected printer 3 (indicated by symbol (13) in FIG. 15). Receiving the print job, the printer 3 performs printing according to the print job (indicated by symbol (14) in FIG. 15).

As described above, according to the second embodiment, the client computer 2 does not directly establish an SSL communication session with a printer 3. Instead, the client computer 2 sends, via the server computer 1, a print job to a printer 3 after establishing an SSL communication session with the printer 3 via the server computer 1 that serves as a relay. This makes it possible to request a printer 3 on the network to perform a printing operation by secure communication. In establishing an SSL communication session between the printer 3 and the server computer 1, the printer 3 is regarded as a client of the server computer 1. Therefore, the printer need not incorporate, into itself, a digital certificate for establishment of an SSL communication session. As a result, even where a lot of sites each having such a printer 3 are constructed on a network, it is not necessary to acquire digital certificates for the respective printers 3 and incorporate the certificates into the respective printers 3; the management of the sites is made easier.

Next, a third embodiment of the invention will be described. In the second embodiment, in the case where printers 3 that are registered in the printer management table of the server computer 1 have global IP addresses, the server computer 1 sends a request for sending an SSL communication session establishment request directly to a printer 3 that has been selected as an output destination using its global IP address. However, in this case, if the output destination printer 3 is located inside what is called a firewall, there is a possibility that the request for sending an SSL communication session establishment request is interrupted by the firewall and an SSL communication session cannot be established between the server computer 1 and the printer 3.

To solve this problem, in this embodiment, not only is a printer 3 registered in the printer management table of the server computer 1, but also a TCP session that was established by printer 3's logging in to the server computer 1 by HTTP communication (HTTP connection request), for example, is maintained and an SSL communication session is established when necessary.

Figure 16:
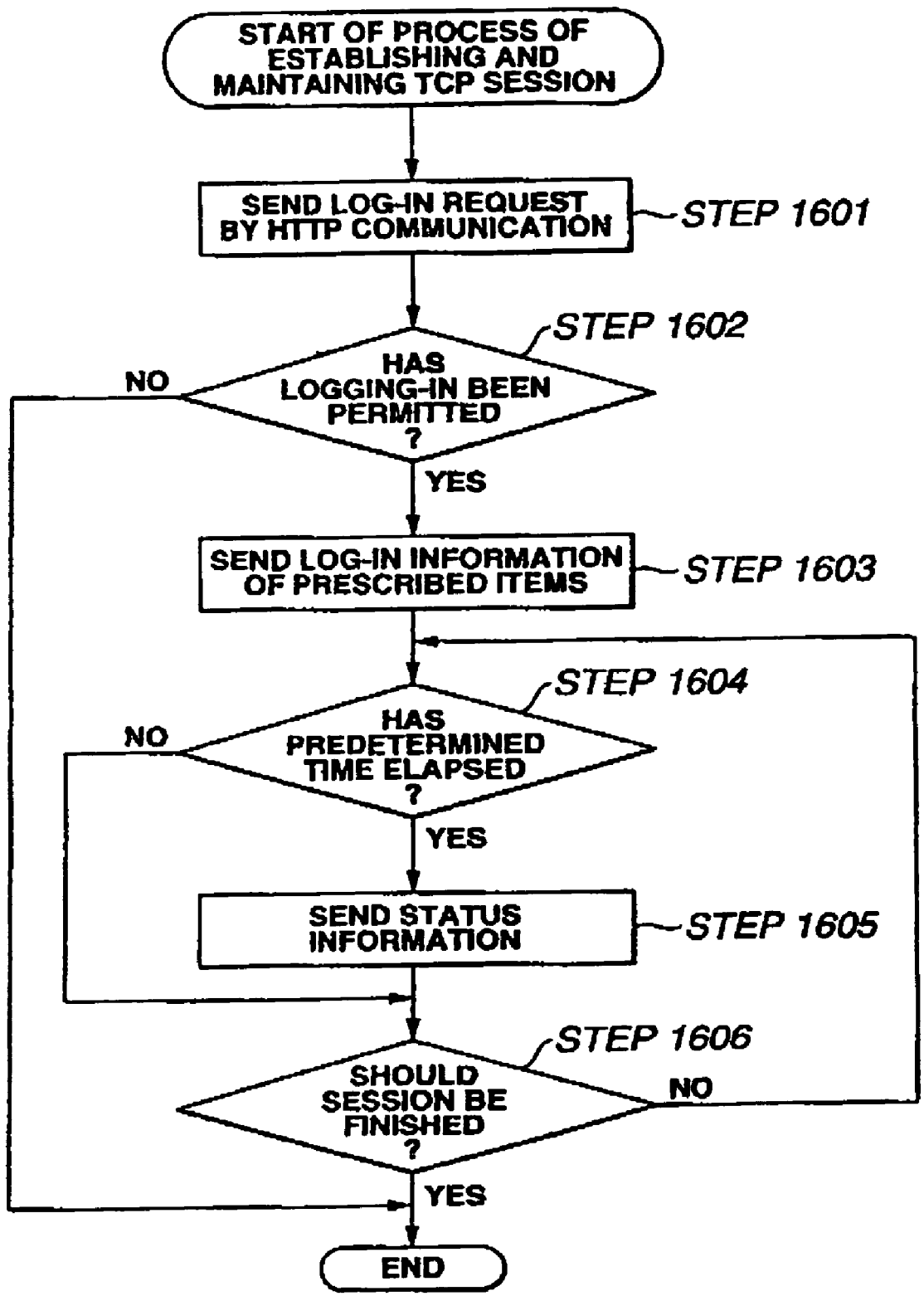
FIG. 16 is a flowchart showing a process according to a third embodiment that is executed by a printer to establish and maintain a TCP session.

FIG. 16 is a flowchart showing a process according to the embodiment that is executed by a printer 3 to establish and maintain a TCP session. As shown in FIG. 16, a printer 3 starts an initialization program upon being powered on. According to the initialization program, the printer 3 sends a log-in request to the server computer 1 by HTTP communication (step 1601). Although this log-in request is not necessarily an SSL communication session establishment request, the invention does not exclude such a case. Upon receiving a log-in permission message that is sent from the server computer 1 as a result of authentication ("yes" at step 1602), the printer 3 sends printer information of prescribed items to the server computer 1 (step 1603). As described above, the server computer 1 starts to manage the printer 3 by registering it in the printer management table. The processing that is performed by the server computer 1 to register the printer 3 is the same as in the first embodiment and hence will not be described. The printer 3 establishes a TCP session with the server computer 1 by sending the log-in request by HTTP communication and logs in to the server computer 1.

On the other hand, if the server computer 1 that allowed the printer 3 to log in has not received any prescribed communications from the printer 3 for a predetermined period, that is, if a time limit has passed, typically the server computer 1 terminates the TCP session and causes the printer 3 to log out. Therefore, after logging into the server computer 1, the printer 3 sends its own status information to the server computer 1 by HTTP communication every predetermined period until the TCP session is forced to finish by, for example, turning off the power (steps 1604-1606). If the time interval at which the printer 3 sends status information is shorter than the time limit, the TCP session is not terminated and the state established by the logging-in is maintained. The status information includes the number of print jobs that are currently spooled in the printer 3. Upon receiving the status information from the printer 3, the server computer 1 updates the contents of the printer management table in accordance with the contents of the status information.

While receiving a log-in request from the printer 3 in the above-described manner, if the printer 3 is selected as an output destination printer by the client computer 2, the server computer 1 sends, to the printer 3, by using the current TCP session, a request for sending an SSL communication session establishment request. Receiving the sending request, the printer 3 operates in the same manner as described in the second embodiment, that is, the printer sends an SSL communication session establishment request to the server computer 1. Then, the printer 3 receives a print job that is sent from the client computer 2 via the server computer 1, and performs a printing operation.

As described above, according to the third embodiment, after the printer 3 has established a TCP session with the server computer 1 by HTTP communication and has logged in to the server computer 1, the printer 3 sends status information every predetermined period to keep the TCP session effective. Therefore, the TCP session is not terminated and the state that was established by the printer 3's logging in to the server computer 1 is maintained. In this embodiment, the server computer 1 sends a request for sending an SSL communication session establishment request using a TCP session that has been established by a request from the printer 3. Therefore, even if the printer 3 is located inside a firewall, the sending request reaches the printer 3 reliably without being interrupted by the firewall.

Although in this embodiment a TCP session between the printer 3 and the server computer 1 is maintained all the time, TCP sessions may be established intermittently at regular intervals.

The above embodiments are just examples for description of the invention and the invention is not limited to the embodiments. The invention can be implemented in various forms without departing from the spirit and scope of the invention. The invention encompasses combinations and subcombinations of the embodiments. Although in each of the above embodiments the flow of each process was described in a sequential manner, the invention is not limited to such a case. The order of the steps of each process may be changed or the steps may be executed parallel as long as no discrepancies occur in operation.

As described above, according to the invention, even in the case where a lot of print sites each of which provides a printing service by secure network communication are constructed on a network, the sites can be managed easily.

According to the invention, even in the case where a print site is located inside a firewall, the print site can provide a printing service by receiving a print request by secure network communication.

What we claimed is:

1. A printing method using a server computer connecting at least one client computer and at least one printer via a network, comprising:

receiving a registration request from the at least one printer and managing as usable printers, the printers that have sent the registration request;

receiving a registration request from the at least one client computer and assigning one of the usable printers to each of the client computers that have sent the registration request;

sending, to an output destination printer that is one of the assigned usable printers, a request for sending a printer secure communication session establishment request to initiate establishment of a printer secure communication session;

receiving, from the output destination printer, a printer secure communication establishment request in response to the request for sending the printer secure communication session establishment request;

establishing the printer secure communication session with the output destination printer based on the printer secure communication establishment request; and transferring a print job sent from the client computer using the established printer secure communication session, wherein the at least one printer is located inside a firewall, the server computer is located outside the firewall, and the server computer receives a communication session establishment request from the output destination printer prior to the request for the printer secure communication session.

2. The printing method according to claim 1, further comprising:

Receiving, from a client computer, a client secure communication session establishment request directed to the output destination printer that is one of the assigned useable printers.

3. The printing method according to claim 1, wherein, before sending the request for sending a printer secure communication session establishment request, a TCP session between the server computer and the output destination printer is established based on a login request sent from the output destination printer.

4. A printer operatively connected to a server computer having a digital certificate, comprising:

a module for sending a registration request, as a usable printer, to the server computer, the usable printer being one of a plurality of assigned usable printers assigned to one or more client computers;

a module for receiving, from the server computer, a request for sending a printer secure communication session establishment request as an output destination printer that is one of the assigned usable printers to each of the one or more client computers; and a module for sending a printer secure communication session establishment request to the server computer to establish a printer secure communication based on the digital certificate, wherein the printer is located inside a firewall, the server computer is located outside the firewall, and the server computer receives a communication session establishment request from the printer prior to the request for the printer secure communication session.

* * * * *